US012008147B2

(12) United States Patent
Bakopoulos et al.

(10) Patent No.: US 12,008,147 B2
(45) Date of Patent: Jun. 11, 2024

(54) CO-PACKAGED SWITCH WITH INTEGRATED QUANTUM KEY DISTRIBUTION CAPABILITIES

(71) Applicant: MELLANOX TECHNOLOGIES, LTD., Yokneam (IL)

(72) Inventors: Paraskevas Bakopoulos, Ilion (GR); Ioannis (Giannis) Patronas, Piraeus (GR); Dimitris Syrivelis, Volos (GR); Liron Mula, Ramat Gan (IL); Aviad Levy, Ge'alya (IL); Elad Mentovich, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 280 days.

(21) Appl. No.: 17/520,093

(22) Filed: Nov. 5, 2021

(65) Prior Publication Data
US 2023/0132571 A1    May 4, 2023

(30) Foreign Application Priority Data

Oct. 29, 2021 (GR) .............................. 20210100741

(51) Int. Cl.
G06F 21/72 (2013.01)
H04L 9/08 (2006.01)
H04L 9/40 (2022.01)
G06F 21/85 (2013.01)

(52) U.S. Cl.
CPC ............. G06F 21/72 (2013.01); H04L 9/0852 (2013.01); H04L 63/0435 (2013.01); H04L 63/061 (2013.01); *G06F 21/85* (2013.01)

(58) Field of Classification Search
CPC .......... G06F 21/70; G06F 21/71; G06F 21/72; G06F 21/82; G06F 21/85; H04L 9/08; H04L 9/0816; H04L 9/0852; H04L 63/04; H04L 63/0428; H04L 63/0435; H04L 63/06; H04L 63/061
See application file for complete search history.

(56) References Cited

U.S. PATENT DOCUMENTS

| 9,077,577 | B1 | 7/2015 | Ashrafi et al. |
| 9,356,780 | B2 | 5/2016 | Tanizawa et al. |
| 11,451,308 | B1 | 9/2022 | Bucklew et al. |
| 2004/0184615 | A1* | 9/2004 | Elliott ................. H04L 9/0852 380/283 |
| 2008/0165957 | A1 | 7/2008 | Kandasamy et al. |

(Continued)

OTHER PUBLICATIONS

Kim et al. "Technology-Driven, Highly-Scalable Dragonfly Topology," IEEE, 2008 International Symposium on Computer Architecture, 2008, pp. 77-88.

(Continued)

Primary Examiner — D'Arcy Winston Straub
(74) Attorney, Agent, or Firm — Sheridan Ross P.C.

(57) ABSTRACT

Devices, networking devices, and switches, among other things, are disclosed. An illustrative switch is disclosed to include a plurality of optical Input/Output (I/O) ports; a multi-chip module (MCM) assembly including switching circuitry and at least one chiplet that is optically coupled with one of the plurality of optical I/O ports; and a controller coupled with the at least one chiplet and configured to couple the at least one chiplet with a Quantum Key Distribution (QKD) device.

24 Claims, 10 Drawing Sheets

(56) References Cited

U.S. PATENT DOCUMENTS

| | | | |
|---|---|---|---|
| 2013/0101119 A1* | 4/2013 | Nordholt | H04L 9/0852 |
| | | | 380/278 |
| 2014/0205302 A1* | 7/2014 | Chen | H04B 10/5561 |
| | | | 398/188 |
| 2015/0269396 A1* | 9/2015 | Grafton | G06F 21/74 |
| | | | 726/2 |
| 2017/0214525 A1 | 7/2017 | Zhao et al. | |
| 2022/0006627 A1 | 1/2022 | Ko et al. | |
| 2022/0360558 A1* | 11/2022 | Bauer | H04L 63/0428 |

OTHER PUBLICATIONS

Mellette et al. "Expanding across time to deliver bandwidth efficiency and low latency," 17th USENIX Symposium on Networked Systems Design and Implementation, Feb. 2020, 19 pages.

Tessinari et al. "Field trial of dynamic DV-QKD networking in the SDN controlled fully meshed optical metro network of the Bristol city 5GUK test network," ECOC2019, Dublin Ireland, 4 pages.

* cited by examiner

CO-PACKAGED SWITCH WITH INTEGRATED QUANTUM KEY DISTRIBUTION CAPABILITIES

CROSS REFERENCE TO RELATED APPLICATION

This application claims the benefit of Greece Patent Application No. 20210100741 filed Oct. 29, 2021, the disclosure of which is incorporated herein by reference in its entirety.

FIELD OF THE DISCLOSURE

The present disclosure is generally directed to systems, devices, and methods for encrypted data transfer.

BACKGROUND

Modern datacenters employ various devices and methods for high-speed data exchange that are vulnerable to malicious attacks, particularly when the data being exchanged is unencrypted.

BRIEF SUMMARY

In an illustrative embodiment, a switch includes: a multi-chip module (MCM) assembly, where the MCM assembly includes: switching circuitry; an encryption unit that is configured to encrypt and/or decrypt communications processed by the switching circuitry; and a controller coupled with the MCM assembly and configured to provide inter-connectivity between the MCM assembly and a Quantum Key Distribution (QKD) device.

In an illustrative embodiment, a networking device includes: a plurality of optical Input/Output (I/O) ports; a multi-chip module (MCM) assembly including switching circuitry and at least one chiplet that is optically coupled with one of the plurality of optical I/O ports; and a controller coupled with the at least one chiplet and configured to couple the at least one chiplet with a Quantum Key Distribution (QKD) device.

In an illustrative embodiment, a device includes: processing circuitry configured to: facilitate communication between a quantum key distribution (QKD) device and a plurality of encryptor/decryptor devices of a plurality of chiplets coupled to a main chip; and perform at least one QKD function on behalf of the QKD device.

Additional features and advantages are described herein and will be apparent from the following Description and the figures.

BRIEF DESCRIPTION OF THE DRAWINGS

The present disclosure is described in conjunction with the appended figures, which are not necessarily drawn to scale.

DETAILED DESCRIPTION

Figure 1:
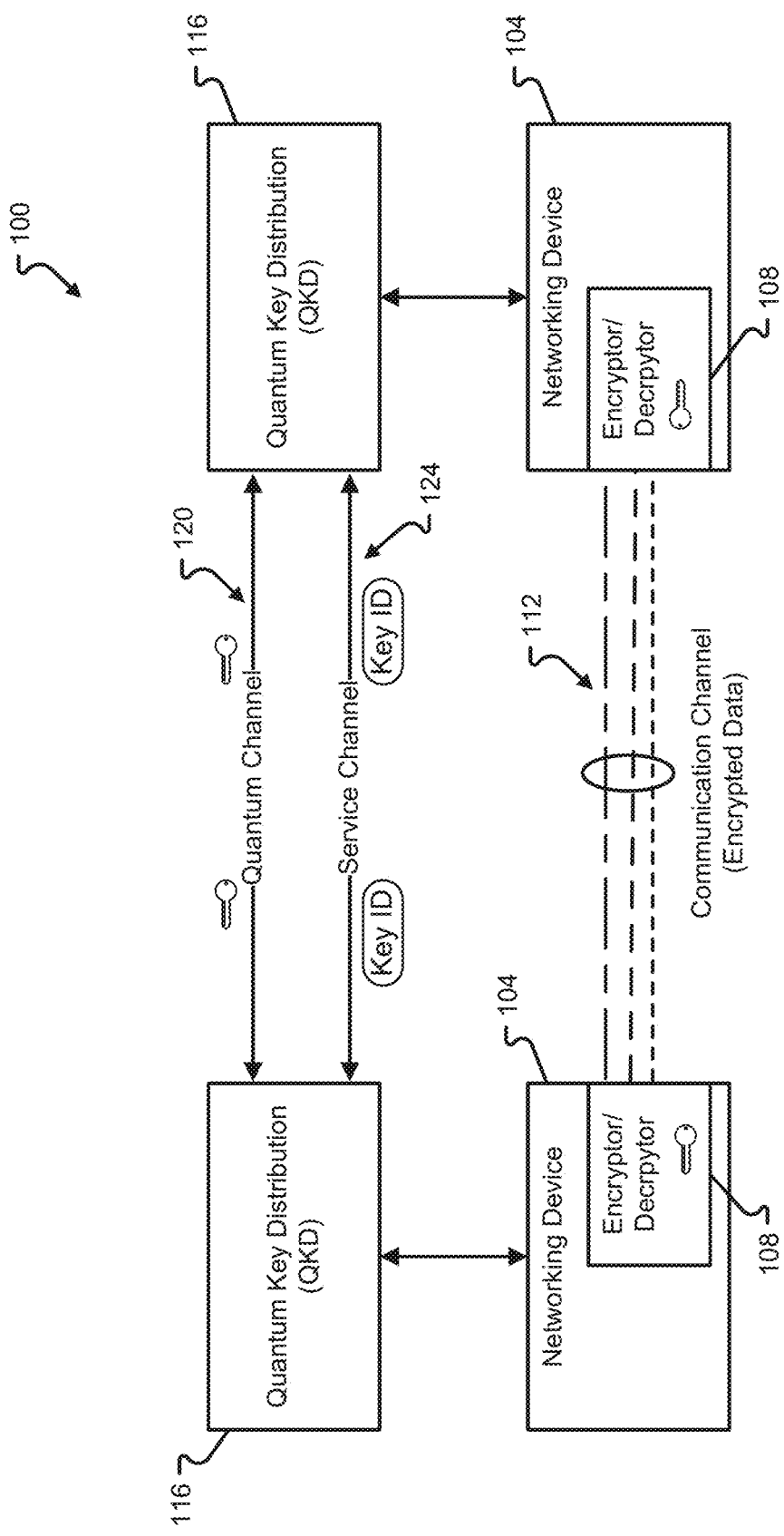
FIG. 1 illustrates a system according to at least one example embodiment.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Inventive concepts relate to QKD devices and systems implementing the same.

Data security and privacy are among the top concerns in the datacenter environment. The financial cost of a security breach can be substantial, especially when customer data is exposed. Sensitive data has historically been protected by Internet Protocol (IP) segmentation and firewalls with intrusion prevention systems that were simple and faster than encryption. However, as workloads in the corporate data enter begin to migrate to the public cloud, the need to encrypt any data traversing the network becomes foundational. Hyperscale cloud service providers are increasingly enabling encryption across their massive Data Center Interconnect (DCI) networks to meet customer expectations.

To eliminate vulnerabilities in the public cloud infrastructure all segments of the cloud datacenter network need to be fortified with encryption, including the intra-datacenter segment which poses additional challenges due to the large number of connections and smaller margins.

Overall, the security of an encryption system is limited by its weakest link. In existing systems, the known weakest link is identified as the key exchange protocol like Diffie-Hellman and Rivest-Shamir-Adleman (RSA). These systems rely on the computational complexity of the associated algorithms; it is in principle possible to hack the system provided that extremely strong processing power is available. Current systems are designed in such a way that breaking the key exchange algorithm would take unrealistic time even if the state-of-the-art processing systems are used, thus making the encryption practically unhackable. However, the advent of quantum computers is expected to disrupt this methodology since the available processing power will scale exponentially.

A quantum computer capable of implementing Shor's algorithm could factor large integers exponentially faster than a classical computer, rendering common asymmetric public key encryption protocols such as RSA ineffective. Such a quantum computer can crack public encryption protocols much faster than a classical computer, rendering them unsecure. New "quantum secure" key exchange solutions are required, and ongoing research is investigating software and hardware approaches. On the software side, Post Quantum Cryptography (PQC) is focusing on algorithms that are quantum-resistant (e.g., encryption methods based on math that a quantum computer is not advantaged in computing). On the hardware side, QKD facilitates key exchange by exchanging photons which, by the principles of quantum physics, will be perturbed in a detectable way if an eavesdropper is present. Consensus is that for highest security a hybrid approach should be pursued, combining PQC with QKD.

A pervasive and future-proof solution for intra-datacenter security combining PQC and QKD faces several challenges, primarily related to the hardware nature and current implementation particularities of QKD.

QKD equipment is commercially available and is finding application in use cases where particular point-to-point links need to be secured, such as in inter-datacenter connections. The hardware essence of QKD requires changes to the overall network design and infrastructure. Typically, QKD equipment is added alongside existing network equipment to facilitate key exchange in select connections which are considered non-trusted. For example, in the DCI use case, each individual datacenter network is considered a trusted zone and only the connections between datacenters are enhanced by QKD. Hence, only the DCI-facing ports of the relevant network infrastructure are combined with the QKD equipment and are encrypted using QKD keys. Current QKD equipment is considerably bulky (e.g., a rack mountable form factor with several rack units of height); however, as only a few units are needed, integration is feasible without significant implications to the data center operator. However, when migrating to an intra-datacenter installation following the zero-trust concept where all links have to be secured, the number of QKD connections rises dramatically. The current form factor of QKD equipment inhibits realistic deployment inside the datacenter as it would consume the majority of each rack's volume and would degrade computational density. It is expected that new technologies (such as photonic integrated circuits) will enable the future miniaturization of QKD equipment. However, the appropriate integration of such miniaturized equipment in several/all ports of datacenter switches has not been defined yet, and is one aspect of the present disclosure.

The above-described systems, methods, and devices will now be explained with reference to FIGS. 1-5.

FIG. 1 illustrates a possible system 100 configuration in which QKD devices 116 are deployed alongside networking devices 104. A QKD secured link or encrypted communication channel 112 connects two networking devices 104. Examples of networking devices 104 include, without limitation, edge routers, switches, Network Interface Cards, Top of Rack (ToR) switches, server blades, etc. Each networking device 104 can have encryption capabilities, via an encryptor/decryptor 108, for particular ports (typically hardware accelerated to achieve high line speeds) or, alternatively, can be connected to a dedicated device serving as an encryptor for each port. Encrypted data is exchanged through the communication channel 112 directly connecting the two networking devices 104.

The encryptor/decryptor 108 of each networking device 104 utilizes QKD keys that have been exchanged via the QKD devices 116. The encryptor/decryptor 108 may include suitable hardware and/or software for encrypting data and storing the encrypted data on encrypted memory. The encryptor/decryptor 108 may further include suitable hardware and/or software for decrypting the data from encrypted memory. The encryptor/decryptor 108 may encrypt data from one or more Central Processing Units (CPUs) using a key received from a local root of trust over an isolated (secure) channel established with the QKD device 116. The encryptor/decryptor 108 may include encrypted memory in the form of volatile and/or non-volatile storage devices. Non-limiting examples of suitable memory devices for the encrypted memory include flash memory, Random Access Memory (RAM), variants thereof, combinations thereof, or the like. The encrypted memory may be main system memory of the networking device 104, peripheral device dedicated memory (e.g., Graphics Processing Unit (GPU) memory), encrypted storage (e.g., NVMe Over Fabric), and/or storage class memory.

The QKD keys are exchanged directly from the QKD devices 116 through a quantum channel 120. An additional service channel 124 between the QKD devices 116 may be used to facilitate the implementation of the QKD protocol. The service channel 124 may be used by the QKD devices 116 to exchange information about key identifiers and does not carry the actual keys. Therefore, any information exchanged via the service channel 124 will not necessarily compromise the system's 100 security.

Each networking device 104 may be connected to a QKD device 116 through a physical link. An illustrative, but non-limiting example of a physical link that may be used to couple a QKD device 116 to a networking device 104 is a 1GbE LAN port. Communication between the QKD device 116 and the networking device 104 aims to provide the QKD keys and key IDs to the networking device 104 and is typically implemented according to existing standards such as the ETSI014. In this standard the QKD device 116 exposes an https server from whom the networking device 104 queries the key IDs. The QKD device 116 and the networking device 104 are located on the same site, which is considered a secure domain; therefore, the link between them does not introduce security vulnerabilities.

While illustrated and described as a network element, it should be appreciated that the networking device 104 may correspond to any type of device that becomes part of or is connected with a communication network. Other examples of suitable devices that may act or operate like a networking device 104 as described herein include, without limitation, one or more of a Personal Computer (PC), a laptop, a tablet, a smartphone, a server, a collection of servers, or the like.

The communication channel 112 is described as traversing a datacenter, but it should be appreciated that the communication channel 112 may traverse any type of communication network (whether trusted or untrusted). Examples of a communication network that may be used to connect networking devices 104 and support the communication channel 112 include, without limitation, an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the communication network enables data transmission between the networking devices 104 using optical signals. In this case, the networking devices 104 and the communication network may include waveguides (e.g., optical fibers) that carry the optical signals. In one specific, but non-limiting example, the communication network enables data transmission between the networking devices 104 using electrical signals. In this case, the networking devices 104 and the communication network may include conductive wires (e.g., copper wires) that carry the electrical signals. In one embodiment, the communication network enables data transmission with both electrical and optical signals.

With reference now to FIGS. 2-6, various configurations of a networking device 104 that is configured to cooperate with and, in some instance, perform one or more tasks for a QKD device 116 will be described in accordance with at least some embodiments of the present disclosure.

Miniaturized QKD systems are becoming available. The feasibility of integrating a Quantum Random Number Generator (QRNG) 216 in a pluggable form is also contemplated. In some embodiments, the networking device 104 may be configured to include or interact with pluggable QKD devices 116, which may be connected to a front panel 204 of the networking device 104. In this way, the QKD device along with the QRNG 216 may represent a QKD system that is integrated (partially or completely) on the networking device 104. It may be desirable to expose a portion of the QKD system (e.g., the QKD device 116) at the front panel 204 of the networking device 104 for space management, among other things. Such a concept would fit nicely to a networking device 104 (e.g. an edge router) as such devices provide available space on their front panel 204 to add extra pluggable transceiver ports 212. However, traditional DCN ToR switches do not normally offer space on their front panel 204, as the entire front panel 204 is consumed by the transceiver ports 208 for data Inputs/Outputs (I/Os). In other words, front panel 204 density is a challenging task in DCN switches. In such a situation, using one or more transceiver ports 208 of a ToR switch to connect pluggable QKD systems would compromise the overall throughput of the switch.

As can be appreciated, various design considerations will be described in connection with different networking devices 104. It should be appreciated that any combination of approaches can be combined or portions of certain approaches may be used without departing from the scope of the present disclosure. For instance, a pluggable QKD device 116 may be used while a separate QRNG 216 is externally connected to a networking device 104 (e.g., rather than being mounted directly adjacent to the location where the pluggable QKD device 116 will be inserted on the front panel 204).

One aspect of the present disclosure is to provide a level of integration of QKD functionality in co-packaged datacenter switches or similar networking devices 104. Several different architectures are proposed, enabling different partitioning of functionalities.

Co-packaging may refer to the close integration of different electrical and/or optoelectronic chips in the same package. The different chips that constitute the co-packaged system are assembled on a single substrate in what is typically called a multi-chip module (MCM) assembly 224. The MCM assembly 224 can include switching circuitry 228 surrounded by peripheral chips, which may also be referred to as satellite chips or chiplets 236. In some embodiments, the switching circuitry 228 and chiplets 236 are all mounted on a common substrate, although such a configuration is not required. The MCM assembly 224 may be provided in a larger housing of the networking device 104, positioned behind the front panel 204 and transceiver ports 208, 212 exposed at the front panel 204. The switching circuitry 228 may include one or more core digital Application Specific Integrated Circuits (ASICs), CPUs, GPUs, microprocessors, FPGAs, combinations thereof, and the like.

In the context of high-throughput DCN switches and optoelectronics, co-packaging allows transferring the optoelectronic transceivers 240 from the front panel 204 (where they are currently deployed in the form of pluggable modules) to the MCM chiplets 236 inside the enclosure of the networking device 104. The fiber optical I/Os from the chiplets 236 are transferred to the front panel 204 where compact optical connectors now reside, replacing the bulky pluggable ports. This saves front panel 204 area which can be used to accommodate integration of a QKD system.

Figure 2:
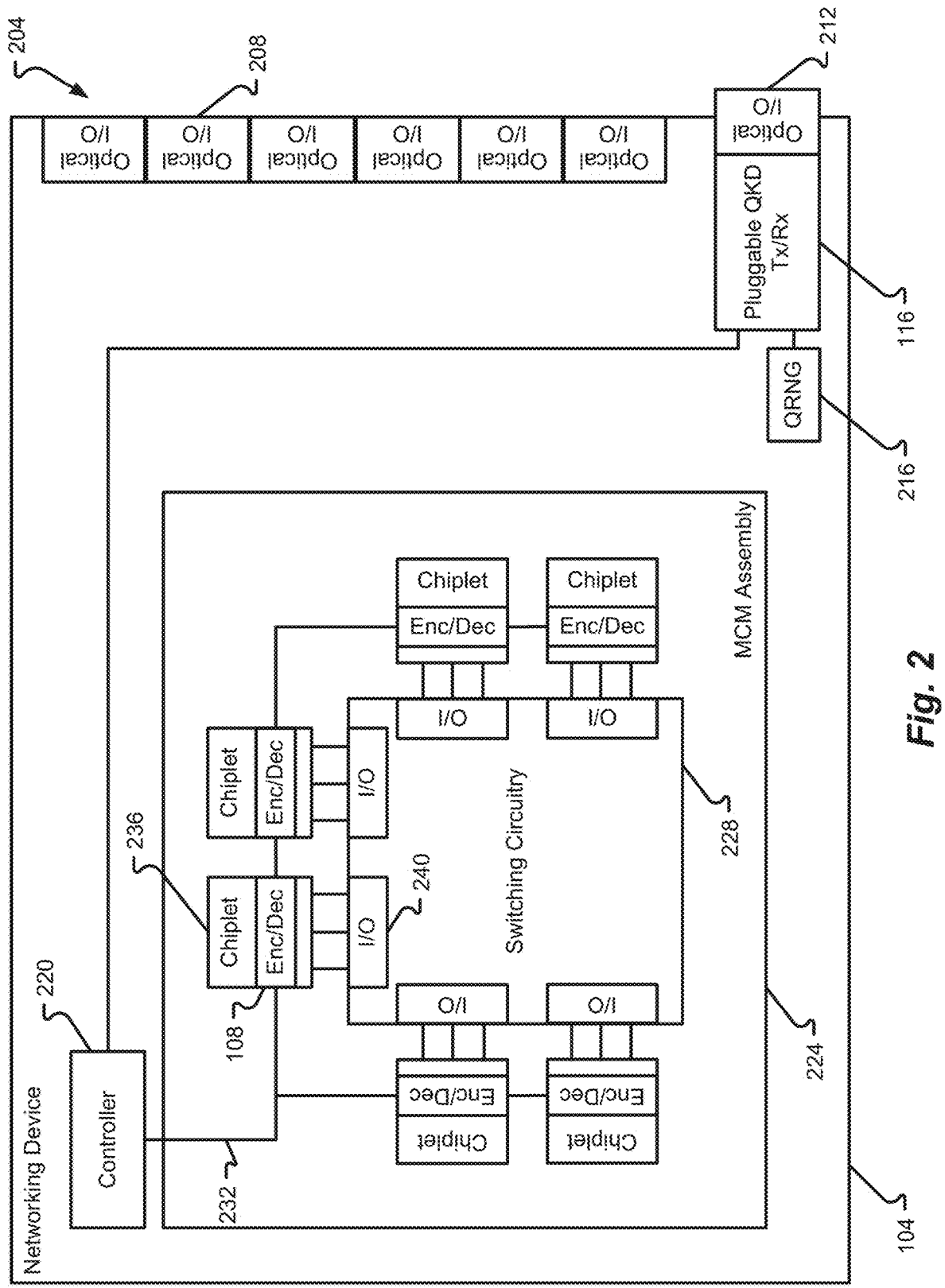
FIG. 2 illustrates a first possible configuration of a networking device according to at least one example embodiment.

Referring now to FIG. 2, a first possible configuration of the networking device 104 and its integration with a QKD system (e.g., the pluggable QKD device 116 and the QRNG 216) will be described in accordance with at least some embodiments of the present disclosure.

In a non-limiting example, the co-packaged networking device 104 may be provided as a switch enclosure that is, for instance, a rackmount unit. The networking device 104 may include the MCM assembly 224, optical transceiver ports 208, a pluggable transceiver port 212, the pluggable QKD device 116, a QRNG 216, and a controller 220.

The MCM assembly 224 may include switching circuitry 228 and one or multiple chiplets 236 assembled on a common substrate. It should be appreciated, however, that different possibilities on the segregation of QKD functionalities among the chiplets 236 on the MCM assembly 224 are possible as will be described with reference to FIGS. 7A-7D. One, some, or all of the chiplets 236 may offer encryption and/or decryption capabilities. In particular and without limiting embodiments of the present disclosure, a chiplet 236 may be configured to include an encryptor/decryptor 108 that is coupled (e.g., directly coupled or indirectly coupled) to the controller 220 and/or to another encryptor/decryptor 108 of another chiplet 236. The connection between the controller 220 and chiplets 236 may be achieved using a data interface 232, such as a serial interface. Non-limiting examples of a data interface 232 that may be used include an I2C interface, a Serial Peripheral Interface (SPI), any other synchronous serial communication interface, etc.

As discussed above, optical transceiver ports 208 are placed at the front panel 204. Here the transceiver functionality may be implemented at the chiplet 236, but the ports 208 are transferred to the front panel 204 through fibers. Optical fibers from the chiplets 236 may be routed to the optical transceiver ports 208 at the front panel 204. The communications between the chiplets 236 and optical transceivers 208 may pass through the controller 220 and/or QKD device 116. In the illustrated configuration, the QKD device 116 is provided as a pluggable device which interfaces with the front panel 204 of the networking device 104. As can be appreciated, the networking device 104 may include a pluggable interface that receives and hosts the pluggable QKD device 116.

The controller 220 is shown to facilitate communications between the QKD device 116 and components of the MCM assembly 224. The controller 220 may include one or more of a processor, microcontroller, or dedicated, bespoke ASIC (e.g., a particular type of microcontroller or μC). The controller 220 may be configured to communicate with the chiplets 236 using data interface 232 and then communicate with the QKD device 116 using an optical and/or electrical communication pathway. In some embodiments, the controller 220 may communicate with the QKD device 116 or other components of the QKD system via at least one of an electrical trace, an optical cable, or any other suitable type of networking cable.

In some embodiments, the QRNG 216 may be provided as a chip that can communicate with the QKD device 116 as well as with the MCM assembly 224 through a serial interface, providing truly random numbers to facilitate secure encrypted communications over a communication channel 112. It should be appreciated that the QRNG 216 may be provided in a pluggable form similar to the QKD device 116.

As will be discussed in further detail herein, the QKD device 116 may include a number of components that enable QKD functionality. The networking device 104 and/or MCM assembly 224 may be configured to perform one or more of the QKD functions on behalf of the QKD device 116. Examples of functional building blocks or components that may be provided in a QKD device 116 include: optics and interfacing electronics for implementing a physical layer of the quantum channel 120; optics and interfacing electronics for implementing a physical layer of the service channel 124; a QKD stack, implementing processes for key generation (e.g., sifting, error correction, confirmation, privacy amplification, etc.); a QKD network protocol, implementing processes for key management (e.g., device pairing, key buffering, interfacing with key consumers; a QRNG, generating true random numbers; and/or a physical interface with key consumers, such as the 1GbE/RJ45 interface used in current QKD devices.

The QKD device 116 (or the QKD system including the QKD device 116 and QRNG 216) may offer all the above-described QKD functions in a single enclosure. However, the integration of the QKD device 116 in the co-packaged networking device 104 allows different segregation of functionalities, shifting some processes outside of the QKD device 116 to save power, space, and/or cost. As mentioned above, different configurations of a networking device 104 are contemplated such that different QKD functionalities may be partitioned in a number of different ways between the QKD device 116, the networking device 104, and/or components of the networking device 104 (e.g., the MCM assembly 224 or components thereof).

Figure 3:
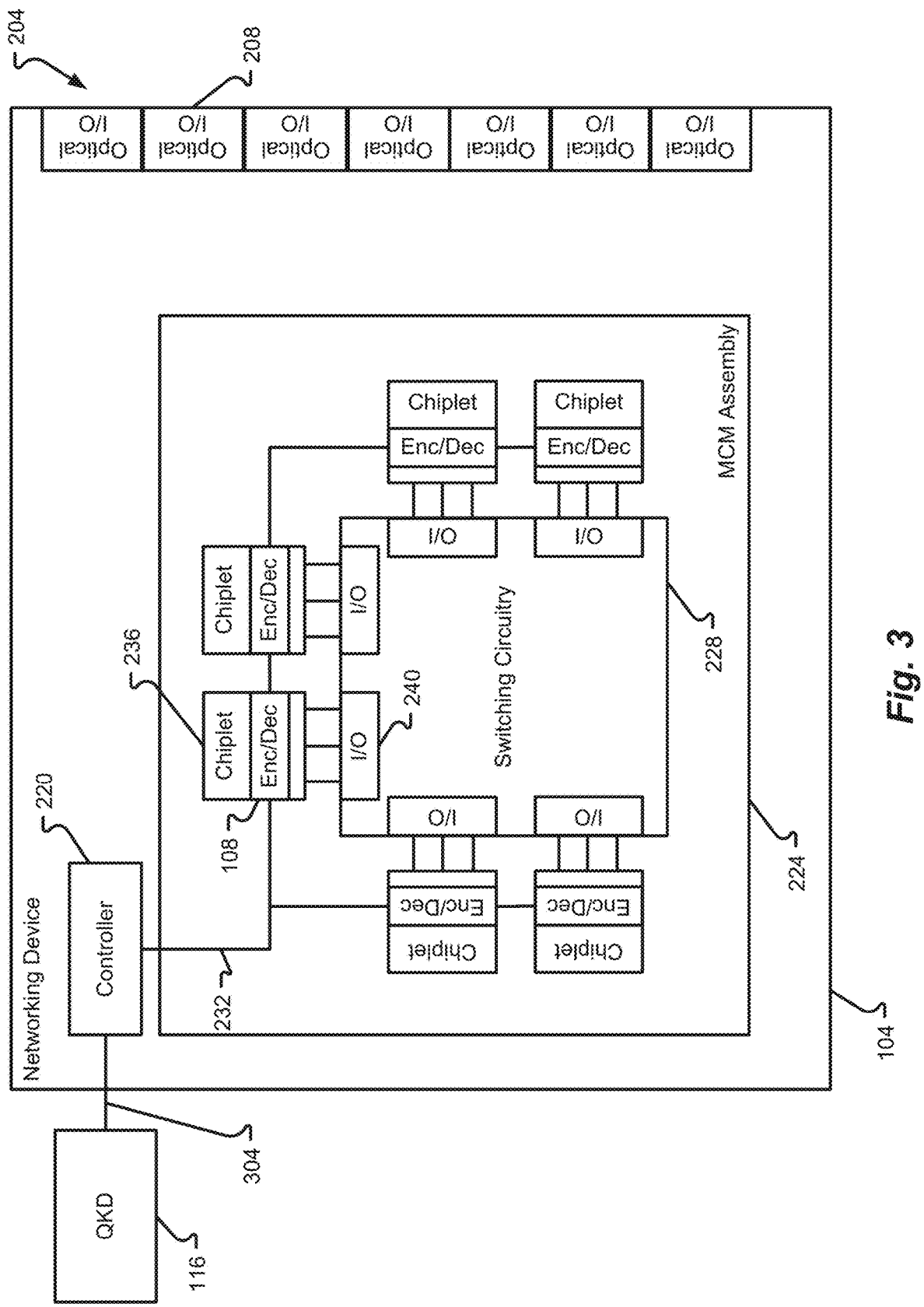
FIG. 3 illustrates a second possible configuration of a networking device according to at least one example embodiment.

Referring now to FIG. 3, another possible configuration of a networking device 104 having a QKD-enabled co-packaged switching circuitry 228 will be described in accordance with at least some embodiments of the present disclosure. In this particular configuration, the networking device 104 is shown to include the MCM assembly 224 and controller 220 in a common enclosure or housing whereas the QKD device 116 (e.g., components of a QKD system) are provided external to the networking device 104. In some embodiments, an external QKD device 116 is interfaced with the networking device 104 (e.g., a switch) using a network interface 304. Illustrative but non-limiting examples of the network interface 304 include a 1GbE with an RJ45 socket.

In this configuration, the controller 220 connects to the QKD device 116 via the network interface 304. The controller 220 may be configured to query keys and their identifiers from the external QKD device 116. The controller 220 may then deliver the key(s) and any identifier for the key(s) to the encryptors/decryptors 108 on the MCM assembly 224. In some embodiments, the ETSI014 protocol can be used where the QKD device 116 exposes an https server and the controller 220 implements the https protocol to obtain key(s) and identifiers for the key(s).

In the example of FIG. 3, the co-packaged networking device 104 includes encryption and decryption capabilities (e.g., QKD functions that can be performed on behalf of the QKD device 116). Different implementations of the MCM assembly 224 are possible. These various implementation options for the MCM assembly 224 may apply to all the configurations of the QKD-enabled networking device 104 shown and described herein, although only particular examples are depicted.

In the configuration of FIG. 3, the QKD device 236 remains external to the networking device 104, therefore it may support some or all of the QKD functions as described herein. As the keys delivered by the QKD device to the controller 220 may be further distributed among the various chiplets 236, additional QKD network functionalities are supported by the controller 220 (e.g., key buffering and key management).

In a different configuration, the co-packaged networking device 104 enclosure provides appropriate slot(s) for pluggable devices implementing the quantum and service channels. The controller 220 communicates directly with the pluggable QKD device 116, which is more tightly integrated; therefore, a serial interface can be used for communication between the controller 220 and the pluggable QKD device 116.

Figure 4:
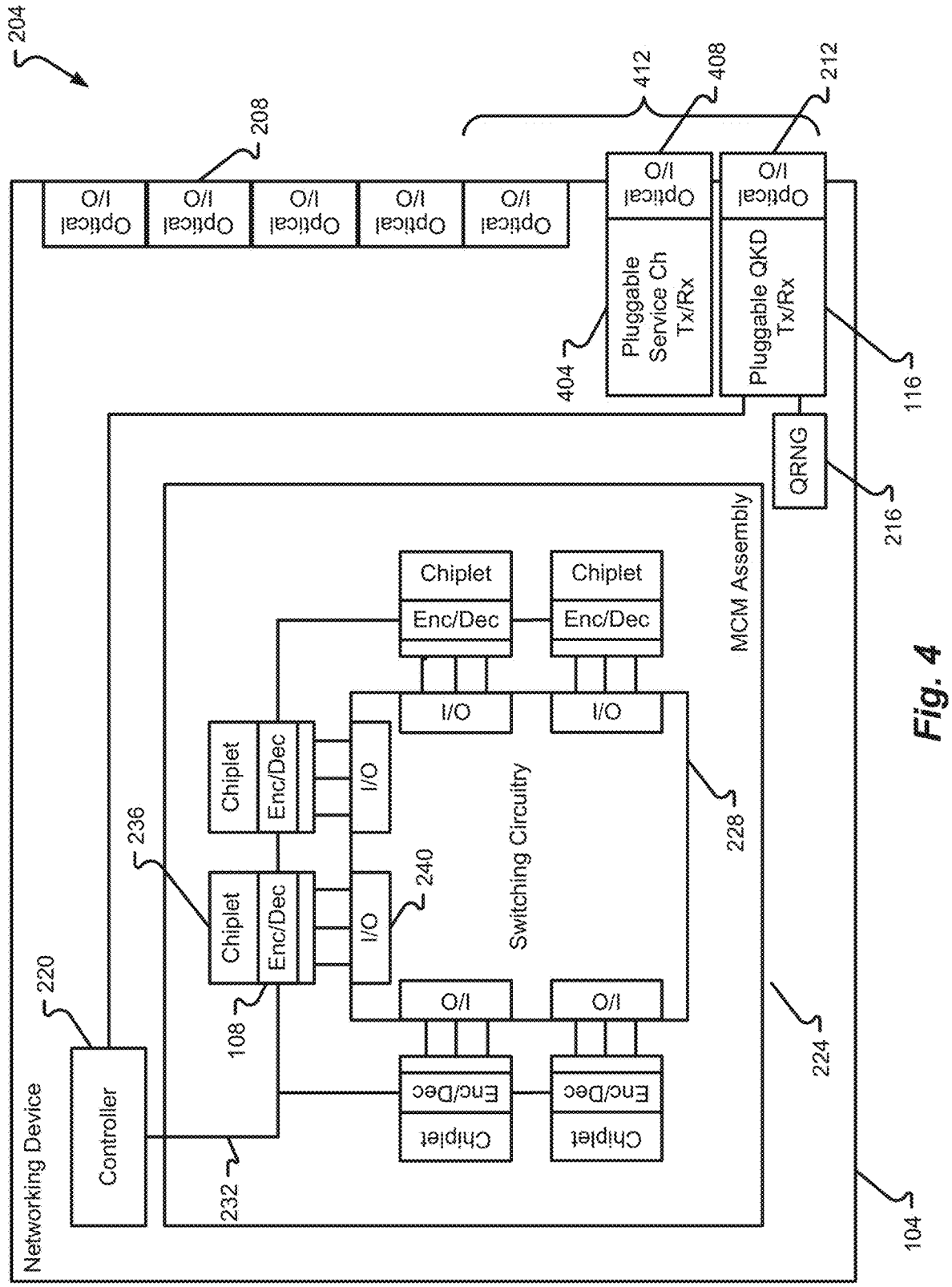
FIG. 4 illustrates a third possible configuration of a networking device according to at least one example embodiment.

Referring to FIG. 4, another possible configuration of the networking device 104 will be described in accordance with at least some embodiments of the present disclosure. In this configuration, the networking device 104 is shown to include a tighter integration of the QKD device 116 with the networking device 104, which affords more flexible partitioning of various QKD functions. For example, the following QKD functions can be transferred to the enclosure of the networking device 104.

QKD network protocol: The protocol implementation can be partially or entirely transferred to the controller 220. This transfer facilitates the control of a separate pluggable 404 implementing the service channel 124 via an additional transceiver interface 408. Alternatively or additionally, the service channel 124 can be implemented in-band with the communication channel 112, without the need for a separate physical medium.

QKD stack: The QKD stack may correspond to a modular set of processes that run on a processor of the QKD device 116 to generate reliable keys from the physical layer. Particular processes can be computationally intensive (e.g., LDPC codes used in Error Correction). These processes could be implemented inside the networking device 104, at the controller 220. Specifically, a more powerful processor may be provided at the controller 220 as compared to the QKD device 116. The controller 220 can then be used as a processing accelerator for the pluggable QKD device 116. This could also be provided in a configuration where a microcontroller and accelerator are provided on separate physical chips.

QRNG: A QKD device 116 may include a QRNG 216 for generating truly random numbers which are subsequently used for the QKD keys. Given that QRNGs 216 are already becoming low cost and integrable, they could be integrated in the networking device 104 as part of its standard configuration, providing random numbers to the entire networking device 104. In this approach, when a QKD device 116 is plugged into the front panel 204, the QKD device 116 may be configured to automatically receive random numbers from the system-integrated QRNG 216.

In the configuration of FIG. 4, the pluggable QKD device 116, the separate pluggable 404, and at least one additional transceiver interface 208 may be used to create a QKD-enabled link 412.

The interface between the pluggable QKD device 116 and a host device can be digital or analog (e.g., depending on whether digitizing and processing electronics are placed inside the pluggable QKD device 116 or at the host side). Hence, a segregation of functionalities allows further flexibility in the placement of hardware.

It should be noted that the configuration of FIG. 4 improves the co-packaged networking device 104 with QKD functionality; however, only a limited number of QKD-enabled links 412 can be accommodated. In other words, the configuration may only upgrade a subset of the transceiver interfaces 208 for secure/encrypted communications whereas other transceiver interfaces 208 may not be upgraded in this configuration. The number of QKD-enabled links 412 that can be added depends on the available area in the front panel 204 and it is expected that it will be lower than the total number of transceiver interfaces 208. Therefore, in this configuration not all the transceiver interfaces 208 may be QKD-enabled.

Figure 5:
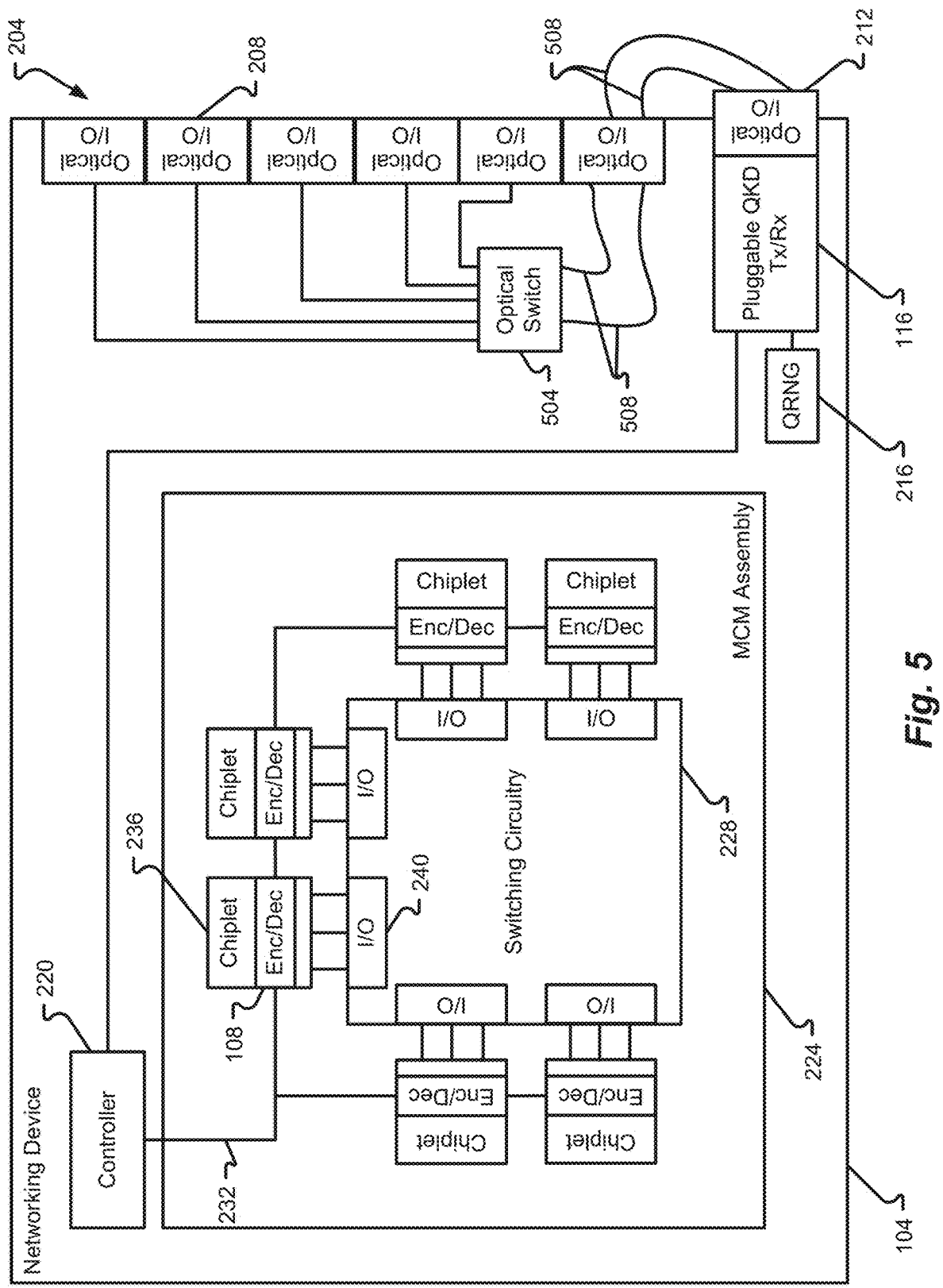
FIG. 5 illustrates a fourth possible configuration of a networking device according to at least one example embodiment.
Figure 6:
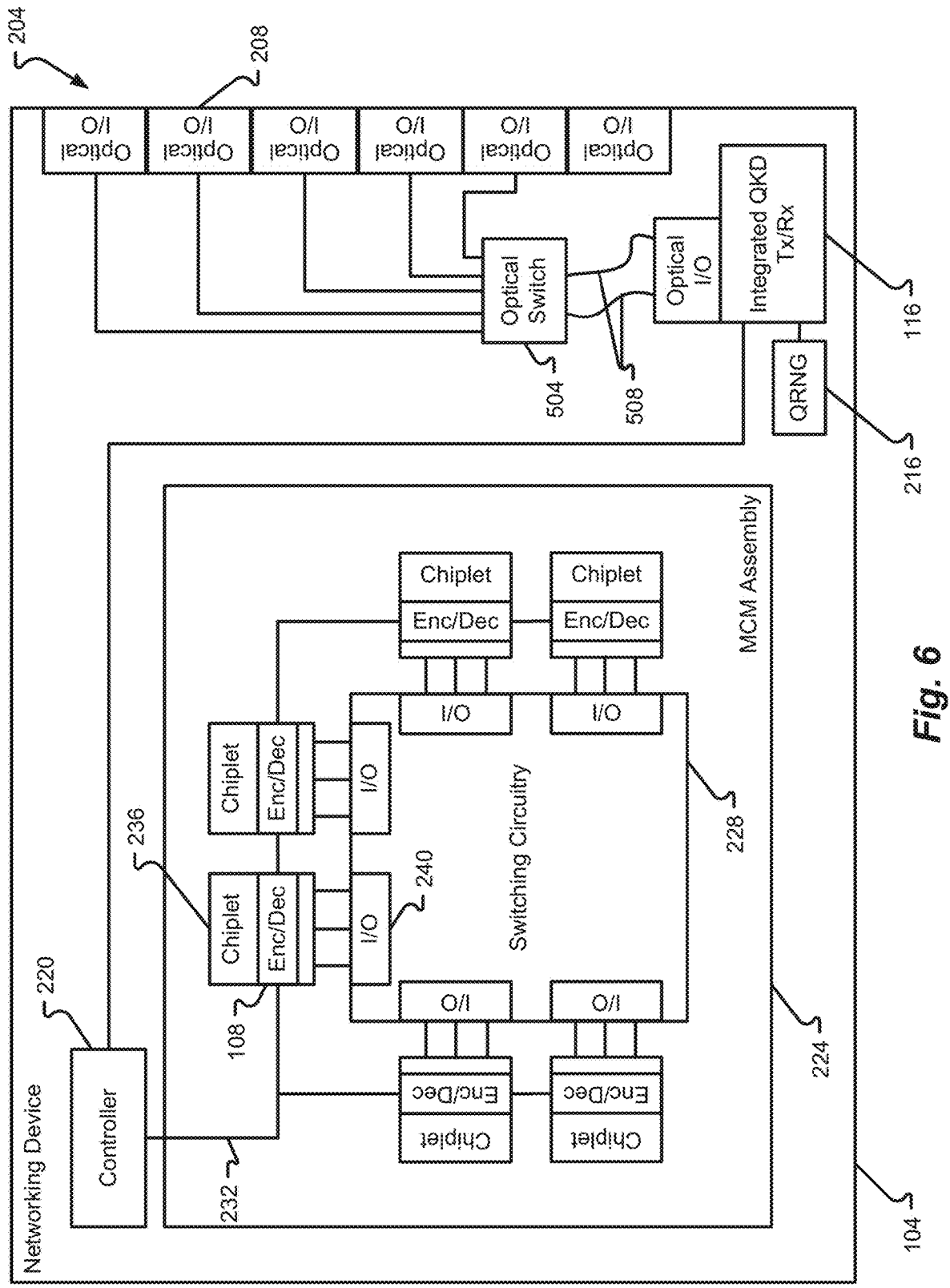
FIG. 6 illustrates a fifth possible configuration of a networking device according to at least one example embodiment.

Referring now to FIG. 5, another possible configuration of the networking device 104 is described that addresses the shortcomings of the configuration depicted in FIG. 4. The configuration illustrated in FIG. 5 is based on the concept of time-multiplexing (e.g., Time Division Multiple Access). Here, a QKD device 116 is capable of exchanging keys at a repetition rate $R_Q$ to enable N quantum channels operating at a speed of $R_Q/N$. The QKD link could also be used for specific links/ports on demand (and not just repetitively for all of them). Moreover, generally speaking, dynamic allocation of the key rate among the connected links/ports is possible and contemplated. Such time-multiplexing of a QKD device 116 could be feasible if layer-2 encryption is required, which has very relaxed requirements in terms of key refresh rate. Alternatively or additionally, a QKD device 116 having a very high key rate capability could be used in the configuration of FIG. 5.

The enclosure of the networking device 104 may include an optical switch 504 that interconnects the interface 212 of the pluggable QKD device 116 with the other interfaces 208 on the front panel 204. The same connectivity of pluggable and optical switch may also be followed for the service channel 124 but is not depicted here for clarity. Multi-fiber optical connectors 508 can be used (e.g., Multi-fiber Push On (MPO)) to combine on the same optical connector fibers coming from the chiplets 236 (carrying data) with fibers 508 coming from the optical switch 504. Here the optical switch 504 and the fibers 508 may carry quantum keys as well as implement the service channel 124. Alternatively or additionally, the different signals (e.g., quantum, service, data) can be combined through appropriate wavelength multiplexers inside the networking device 104 (and corresponding demultiplexers for the Rx part), enabling co-existence of the quantum, service, and data signals in the same fiber 508.

While FIG. 5 illustrates fibers 508 coming out of the QKD device 116 from the front panel and connected back to optical ports 208, it should be appreciated that other configurations are possible and contemplated. This particular configuration is shown following the design of current pluggables that have the fiber interfaces in the front side and the electrical interfaces at the back side. Embodiments of the present disclosure also contemplate an implementation where electrical and fiber interfaces both couple from the back side, so that fibers 508 are not exposed out of the switch enclosure.

In yet another possible configuration, the QKD device 116 can be placed inside the enclosure of the networking device 104. Such a configuration will now be described with reference to FIG. 6 in accordance with at least some embodiments of the present disclosure. In this configuration, an option of integrating the QKD device 116 is possible, with or without the networking device 104, extending on the configurations shown in FIGS. 4 and 5. Although this approach does not offer the flexibility and pay-as-you-go capability of the previous configurations that rely on a pluggable QKD device 116, integrating the QKD device 116 inside the enclosure of the networking device 104 can carry other benefits. One such benefit of utilizing an integrated QKD device 116 is that a pluggable device can be unplugged or replaced by a fake, while an integrated QKD device 116 is not susceptible to simple removal. Another benefit is that the number of QKD devices 116 that can be accommodated does not depend on the front panel 204 area. Instead, the number of QKD devices 116 that can be accommodated by the networking device 104 depends upon the volume inside the enclosure of the networking device 104. The integrated QKD 116 can also be implemented in the MCM assembly 224 to provide additional security against physical tempering of the hardware components inside the switch enclosure. Hence, the QKD 116 and encryptors/decryptors 108 will reside inside the same package, making it nearly impossible to physically intercept the communicated keys even if the switch enclosure is violated.

Utilizing any of the above-described networking device 104 configurations in a Fat tree architecture could possibly result in having point-to-point QKD connections from the ToRs to the Aggregation switches of the POD and from the Aggregation switches to the Core switches. If the trusted zones of the discussed DC are confined on the racks, then a software key management scheme should be implemented to exchange keys among ToRs (either on the same or in different PODs). The number of required QKD enabled ports depends on the oversubscription factor of the network. On a Dragonfly network, for example, regarding the groups as trusted zones, a key management scheme may be used among the switches of each group. The number of QKD enabled links to provide all-to-all (=for all group-to-group) QKD connectivity depends on the radix of the switches and the size of the network.

For relatively "small" networks there is a large number of parallel links connecting each couple of groups, and all of these could be served with a single QKD link while for larger networks the group-to-group links can reach down to 1. In the case of networks based on optical switching such as Opera or Rotornet (e.g., a single layer of ToRs and a single Layer of optical switches) it is possible to provide rack-to-rack QKD connectivity with only one QKD-enabled link per switch. The QKD-enabled link can be connected on the switching fabric which will provide QKD ToR-to-ToR connectivity in timeslots. The required refresh rate of the keys, the timeslot duration, and the secure key rate of the QKD device 116 may define if a single QKD link is enough or if more links are required per ToR switch.

As noted above, the various configurations of a networking device 104 may be utilized to offload at least some QKD functions from the QKD device 116 to other components of the networking device 104. It may also be possible to adjust configurations of the MCM assembly 224. Various configuration alternatives of the switching circuitry 228 and chiplets 236 will now be described with reference to FIGS. 7A-7D in accordance with at least some embodiments of the present disclosure.

Figure 7A:
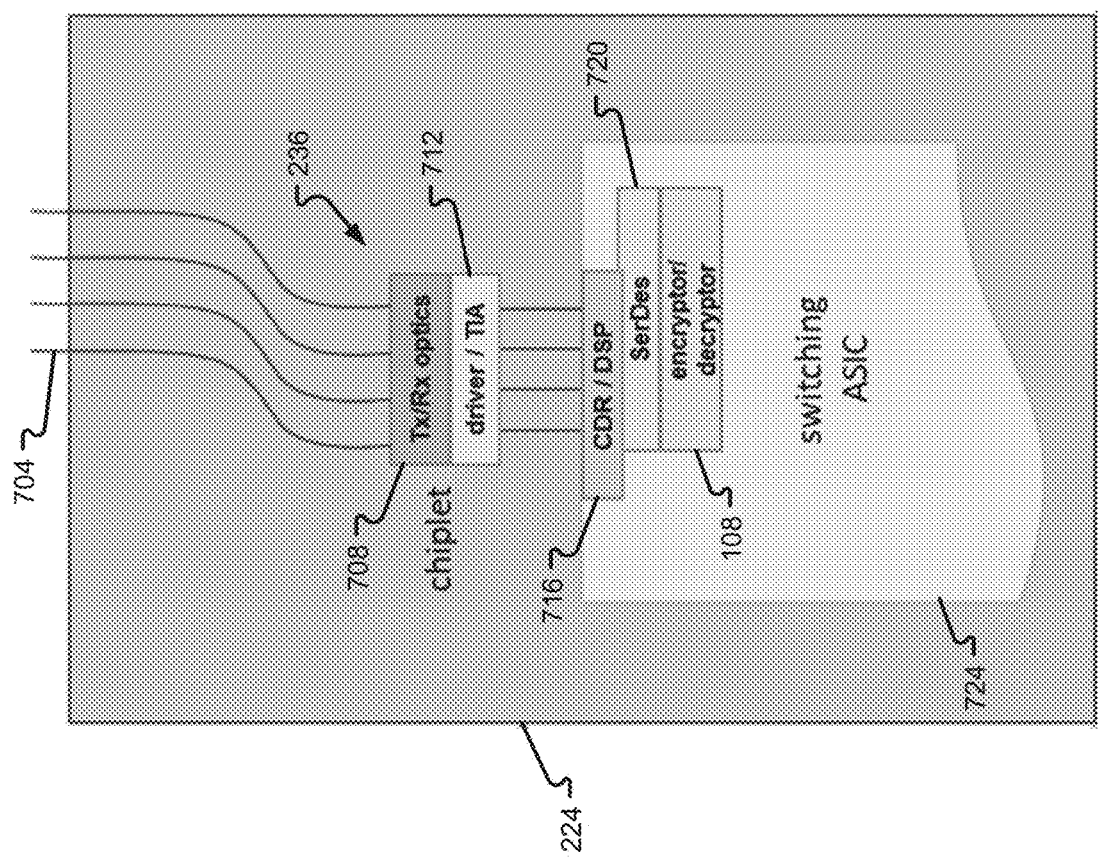
FIG. 7A illustrates one possible configuration of chiplet and switching circuitry according to at least one example embodiment.

Referring initially to FIG. 7A, a first possible configuration is illustrated where fiber I/Os 704 carry data between the chiplet 236 and the controller 220. In some embodiments, the encrypted data may go to the transceiver ports 208 whereas QKD-related communications (e.g., keys, identifiers, etc.) may go to the controller 220. The fiber I/Os 704 may connect with Tx/Rx optics 708, which are connected to driver(s) and/or amplifier(s) 712. In this configuration, the chiplet 236 is shown to include the Tx/Rx optics 708 and the driver(s) and/or amplifier(s) 712. Remaining components are shown as being integrated in the switching circuitry 228, which is illustratively shown as a switching ASIC 724.

Here, the switching ASIC 724 includes a clock data recovery (CDR) and/or digital signal processor (DSP) 716, which interfaces with the chiplet 236 via one or more electrical connections. The CDR/DSP 716 is shown as being connected to a Serializer/Deserializer (SerDes) 720, which is connected to the encryptor/decryptor 108. This particular configuration illustrates an analog chiplet 236 with additional digital processing components being provided on the switching ASIC 724.

Figure 7B:
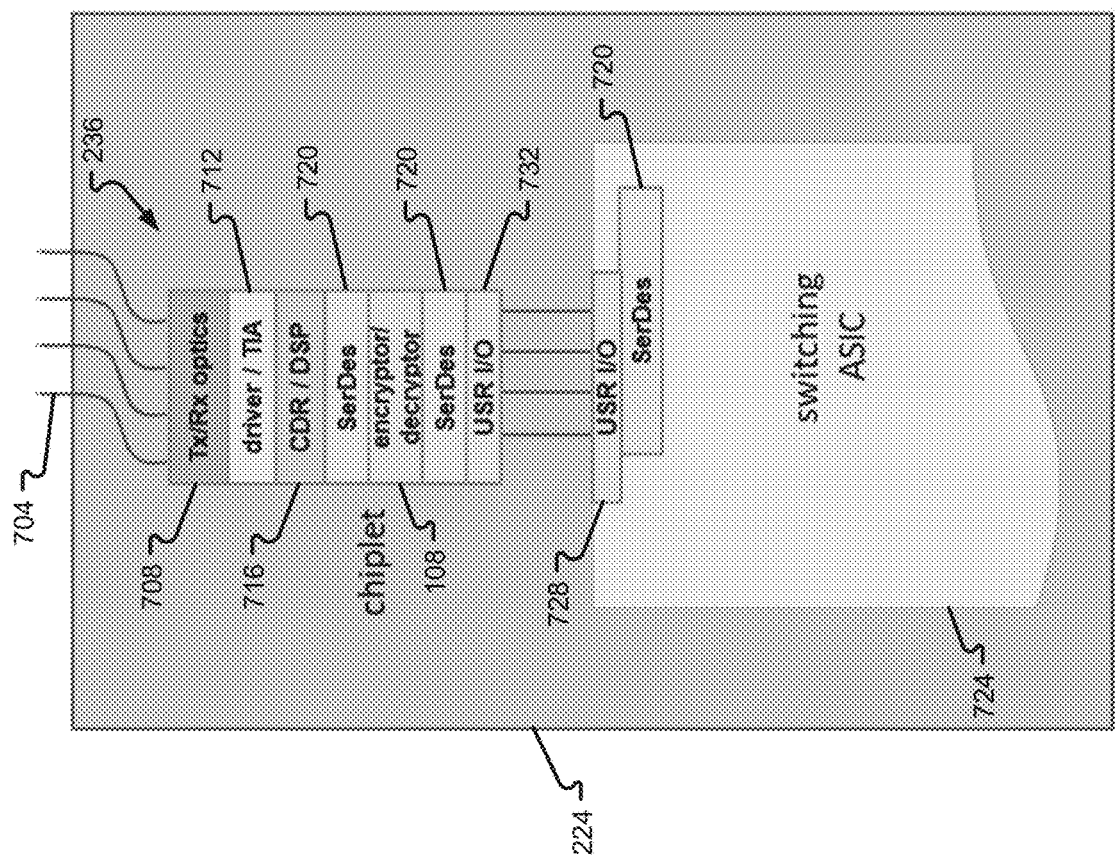
FIG. 7B illustrates another possible configuration of chiplet and switching circuitry according to at least one example embodiment.

FIG. 7B illustrates another possible configuration of the chiplet 236 in which a high-speed serial interface is provided between the chiplet 236 and switching ASIC 724. Here again the chiplet 236 includes the Tx/Rx optics 708, the driver(s) and/or amplifier(s) 712, the CDR/DSP 716, the SerDes 720 (one or more SerDes 720), the encryptor/decryptor 108, and a short-reach serial interface (e.g., an "ultra-short reach" USR or "extra short reach" XSR interface 732). In this configuration, the switching ASIC 724 still includes a SerDes 720 to facilitate the high-speed serial interface between the switching ASIC 724 and chiplet 236.

Figure 7C:
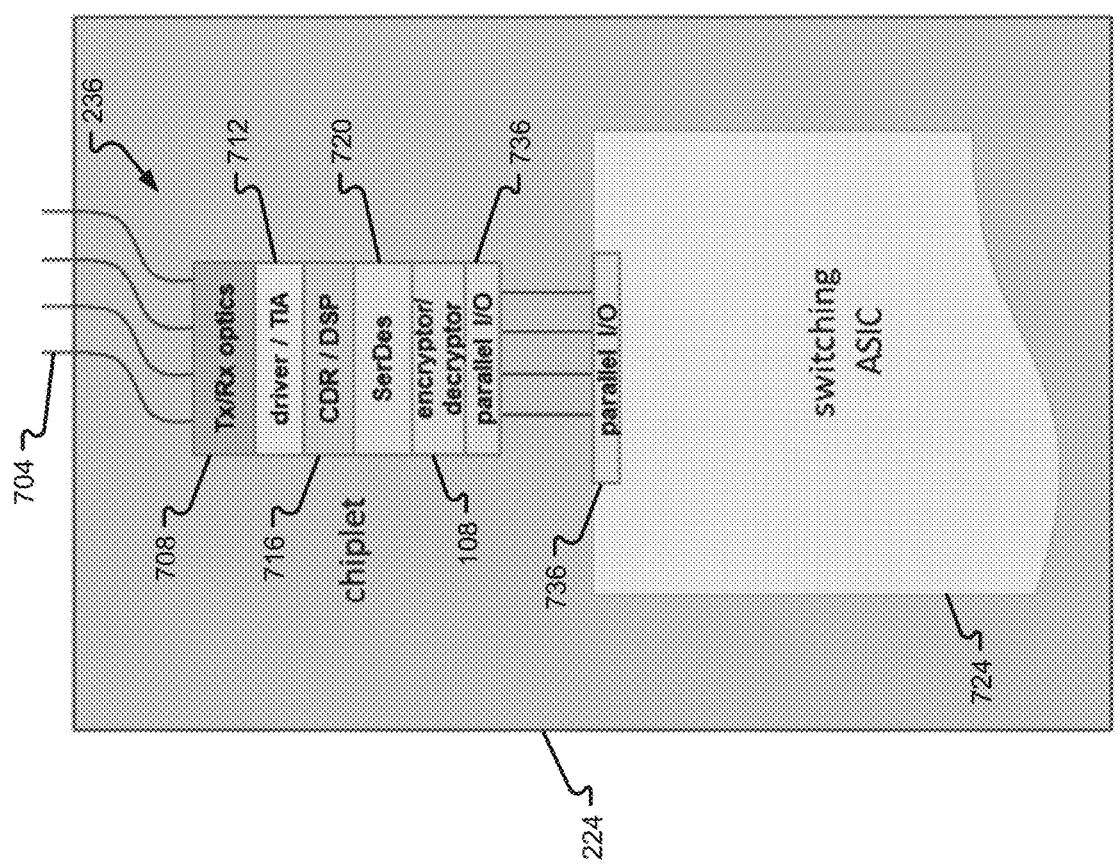
FIG. 7C illustrates yet another possible configuration of chiplet and switching circuitry according to at least one example embodiment.

FIG. 7C illustrates yet another possible configuration in which a low-speed parallel interface is provided between the switching ASIC 724 and chiplet 236. In this configuration, the switching ASIC 724 does not include the SerDes 720, but rather includes a parallel I/O interface 736. The chiplet 236, on the other hand, includes the Tx/Rx optics 708, the driver(s) and/or amplifier(s) 712, the CDR/DSP 716, the SerDes 720, the encryptor/decryptor 108, and a parallel I/O interface 736.

Figure 7D:
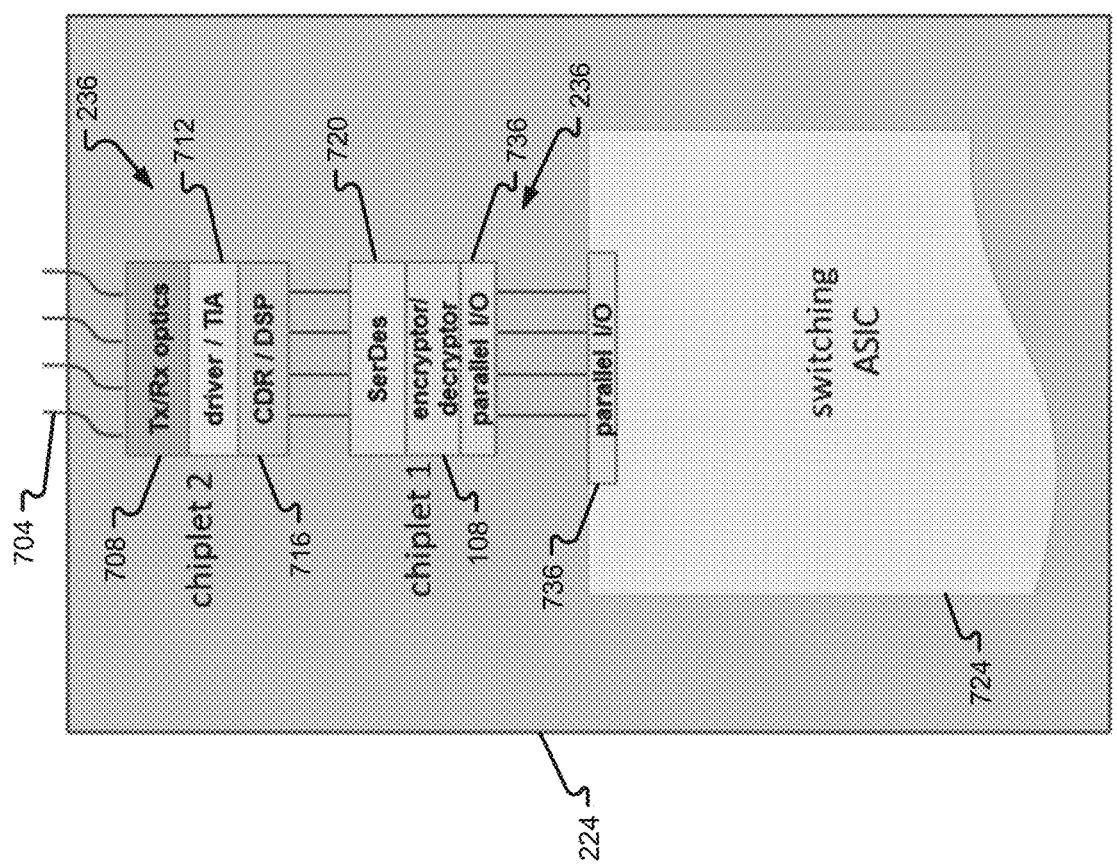
FIG. 7D illustrates another possible configuration of chiplet and switching circuitry according to at least one example embodiment.

FIG. 7D illustrates another possible configuration in which two chiplets 236 are utilized. In this configuration, a low-speed parallel interface is provided between the switching ASIC 724 and a first chiplet 236 whereas a second chiplet 236 is used to connect the first chiplet 236 to the fiber I/Os 704. This approach may correspond to a mixed digital and analog approach where the first chiplet 236 operates in the digital domain whereas the second chiplet 236 operates in the analog domain. Illustratively, the first chiplet 236 may include the parallel I/O interface 736, the encryptor/decryptor 108, and a SerDes 720. The second chiplet 236 may include a CDR/DSP 716, driver(s) and/or amplifier(s) 712, and the Tx/Rx optics 708. Here again the switching ASIC 724 includes the parallel I/O interface 736 to connect with the first chiplet 236.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Example embodiments may be configured as follows:

(1) A switch, comprising:
a multi-chip module (MCM) assembly, comprising:
switching circuitry;
an encryption unit that is configured to encrypt and/or decrypt communications processed by the switching circuitry; and
a controller coupled with the MCM assembly and configured to provide interconnectivity between the MCM assembly and a Quantum Key Distribution (QKD) device.

(2) The switch of (1), wherein the controller is coupled with the MCM assembly via a serial communication interface.

(3) The switch of (1) or (2), wherein the controller is coupled with the QKD device via a network interface.

(4) The switch of one or more of (1) to (3), wherein the controller is coupled with the QKD device via at least one of a trace and a cable.

(5) The switch of one or more of (1) to (4), further comprising:
an optical Input/Output (I/O) port.

(6) The switch of (5), wherein the optical I/O port is coupled with the MCM assembly through the QKD device.

(7) The switch of one or more of (1) to (6), wherein the MCM assembly comprises a plurality of chiplets, wherein at least one of the plurality of chiplets comprises the encryption unit.

(8) The switch of (7), wherein the at least one of the plurality of chiplets further comprises transmission/receiver optics, wherein the transmission/receiver optics are coupled with an optical Input/Output (I/O) port of the switch via an optical fiber, and wherein the encryption unit of the at least one of the plurality of chiplets is coupled to the controller via a serial interface.

(9) The switch of one or more of (1) to (8), wherein the MCM assembly, controller, and QKD device are housed within a common enclosure.

(10) A networking device, comprising:
a plurality of optical Input/Output (I/O) ports;
a multi-chip module (MCM) assembly comprising switching circuitry and at least one chiplet that is optically coupled with one of the plurality of optical I/O ports; and
a controller coupled with the at least one chiplet and configured to couple the at least one chiplet with a Quantum Key Distribution (QKD) device.

(11) A device, comprising:
processing circuitry configured to:
facilitate communication between a quantum key distribution (QKD) device and a plurality of encryptor/decryptor devices of a plurality of chiplets coupled to a main chip; and
perform at least one QKD function on behalf of the QKD device.

(12) The device of (11), wherein the at least one QKD function includes one or more key management operations.

(13) The device of (11) or (12), wherein the at least one QKD function performed by the processing circuitry on behalf of the QKD device includes one or more of the following: providing a physical layer of a quantum channel, providing a service channel, providing a QKD stack, sifting, error correction, confirmation, privacy amplification, key management, device pairing, key buffering, interfacing with a key consumer, providing a Quantum Random Number Generator (QRNG), and providing a physical interface with the key consumer.

(14) The device of one or more of (11) to (13), wherein the processing circuitry includes:
a first port that couples to the plurality of encryptor/decryptor devices; and
a second port that couples to the QKD device.

(15) The device of (14), wherein the first port and the second port each comprise an electrical interface.

(16) The device of (15), wherein the electrical interface for the first port comprises a serial interface.

(17) The device of one or more of (11) to (16), further comprising:
the plurality of chiplets;
the main chip; and
a plurality of input/output ports coupled to the plurality of chiplets.

(18) The device of (17), wherein the plurality of input/output ports are coupled to optical transceivers of the plurality of chiplets.

(19) The device of (17), further comprising:
one or more pluggable ports that detachably connect to the QKD device.

(20) The device of (17), further comprising:
an optical switch coupled between the plurality of input/output ports and at least one port that couples to the QKD device.

What is claimed is:

1. A switch, comprising:
a multi-chip module (MCM) assembly, comprising:
switching circuitry;
an encryption unit that is configured to encrypt and/or decrypt communications processed by the switching circuitry; and
a plurality of chiplets, wherein at least one of the plurality of chiplets comprises the encryption unit; and
a controller coupled with the MCM assembly and configured to provide interconnectivity between the MCM assembly and a Quantum Key Distribution (QKD) device.

2. The switch of claim 1, wherein the controller is coupled with the MCM assembly via a serial communication interface.

3. The switch of claim 1, wherein the controller is coupled with the QKD device via a network interface.

4. The switch of claim 1, wherein the controller is coupled with the QKD device via at least one of a trace and a cable.

5. The switch of claim 1, further comprising:
an optical Input/Output (I/O) port.

6. The switch of claim 5, wherein the optical I/O port is coupled with the MCM assembly through the QKD device.

7. The switch of claim 1, wherein the at least one of the plurality of chiplets further comprises transmission/receiver optics, wherein the transmission/receiver optics are coupled with an optical Input/Output (I/O) port of the switch via an optical fiber, and wherein the encryption unit of the at least one of the plurality of chiplets is coupled to the controller via a serial interface.

8. The switch of claim 1, wherein the MCM assembly, controller, and QKD device are housed within a common enclosure.

9. A networking device, comprising:
a plurality of optical Input/Output (I/O) ports;
a multi-chip module (MCM) assembly comprising switching circuitry and at least one chiplet that is optically coupled with one of the plurality of optical I/O ports; and
a controller coupled with the at least one chiplet and configured to couple the at least one chiplet with a Quantum Key Distribution (QKD) device.

10. A device, comprising:
processing circuitry configured to:
facilitate communication between a quantum key distribution (QKD) device and a plurality of encryptor/decryptor devices of a plurality of chiplets coupled to a main chip; and
perform at least one QKD function on behalf of the QKD device.

11. The device of claim 10, wherein the at least one QKD function includes one or more key management operations.

12. The device of claim 10, wherein the at least one QKD function performed by the processing circuitry on behalf of the QKD device includes one or more of the following: providing a physical layer of a quantum channel, providing a service channel, providing a QKD stack, sifting, error correction, confirmation, privacy amplification, key management, device pairing, key buffering, interfacing with a key consumer, providing a Quantum Random Number Generator (QRNG), and providing a physical interface with the key consumer.

13. The device of claim 10, wherein the processing circuity includes:
a first port that couples to the plurality of encryptor/decryptor devices; and
a second port that couples to the QKD device.

14. The device of claim 13, wherein the first port and the second port each comprise an electrical interface.

15. The device of claim 14, wherein the electrical interface for the first port comprises a serial interface.

16. The device of claim 10, further comprising:
the plurality of chiplets;
the main chip; and
a plurality of input/output ports coupled to the plurality of chiplets.

17. The device of claim 16, wherein the plurality of input/output ports are coupled to optical transceivers of the plurality of chiplets.

18. The device of claim 16, further comprising:
one or more pluggable ports that detachably connect to the QKD device.

19. The device of claim 16, further comprising:
an optical switch coupled between the plurality of input/output ports and at least one port that couples to the QKD device.

20. A switch, comprising:
a multi-chip module (MCM) assembly, comprising:
switching circuitry;
an encryption unit that is configured to encrypt and/or decrypt communications processed by the switching circuitry; and
a plurality of chiplets, wherein at least one of the plurality of chiplets comprises the encryption unit and
a controller coupled with the MCM assembly and configured to provide interconnectivity between the MCM assembly and a Quantum Key Random Number Generator (QRNG).

21. A switch, comprising:
a multi-chip module (MCM) assembly, comprising:
switching circuitry configured to process electrical signals; and
a plurality of chiplets in communication with the switching circuitry, wherein at least one of the plurality of chiplets is configured to process electrical signals and optical signals; and
a controller coupled with the MCM assembly and configured to provide interconnectivity between the MCM assembly and a Quantum Key Distribution (QKD) device.

22. The switch of claim 21, wherein the at least one of the plurality of chiplets is configured to convert electrical signals to optical signals and optical signals to electrical signals.

23. The switch of claim 21, wherein the at least one of the plurality of chiplets includes an encryption unit that is configured to encrypt and/or decrypt the electrical signals processed by the switching circuitry.

24. The switch of claim 21, further comprising:
a plurality of optical input/output (I/O) ports, wherein at least one of the plurality of optical I/O ports is optically connected to the at least one of the plurality of chiplets.

* * * * *